United States Patent
Sakane et al.

(10) Patent No.: US 8,587,243 B2
(45) Date of Patent: Nov. 19, 2013

(54) DRIVE CONTROL SYSTEM

(75) Inventors: Masamichi Sakane, Chiyoda-ku (JP);
Kenta Kaneko, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 57 days.

(21) Appl. No.: 13/262,941

(22) PCT Filed: Apr. 8, 2009

(86) PCT No.: PCT/JP2009/001641
§ 371 (c)(1),
(2), (4) Date: Oct. 5, 2011

(87) PCT Pub. No.: WO2010/116417
PCT Pub. Date: Oct. 14, 2010

(65) Prior Publication Data
US 2012/0019183 A1 Jan. 26, 2012

(51) Int. Cl.
*H02H 7/085* (2006.01)
*H02P 3/02* (2006.01)

(52) U.S. Cl.
USPC ........... 318/473; 318/275; 318/279; 318/434; 318/450; 318/519; 361/14; 361/103; 361/115; 361/634; 361/673

(58) Field of Classification Search
USPC ................ 318/275–279, 434, 446, 450–459, 318/473–478, 491, 492, 519; 363/50, 363/56.01–56.12; 361/14, 103, 115, 116, 361/634, 652, 656–673, 435
See application file for complete search history.

(56) References Cited

U.S. PATENT DOCUMENTS

| 7,352,143 | B2 * | 4/2008 | Inaba et al. | 318/139 |
| 7,622,879 | B2 * | 11/2009 | Hirasawa | 318/471 |
| 7,982,421 | B2 * | 7/2011 | Negoro et al. | 318/454 |
| 8,045,301 | B2 | 10/2011 | Shiba et al. | |

(Continued)

FOREIGN PATENT DOCUMENTS

| JP | 8-182105 A | 7/1996 |
| JP | 9-247805 A | 9/1997 |

(Continued)

OTHER PUBLICATIONS

International Search Report (PCT/ISA/210) issued on Jul. 14, 2009, by Japanese Patent Office as the International Searching Authority for International Application No. PCT/JP2009/001641.

(Continued)

*Primary Examiner* — Eduardo Colon Santana
*Assistant Examiner* — Said Bouziane
(74) *Attorney, Agent, or Firm* — Buchanan Ingersoll & Rooney PC

(57) ABSTRACT

A rotary breaker that interrupts a transmission of a driving force from a motor to a drive mechanism unit is provided between the motor having a permanent magnet incorporated therein and the drive mechanism unit of an electric vehicle. A second controller controls the rotary breaker based on operation states of a power converting unit that has a power converter that drives the motor by converting a direct-current voltage or an alternate-current voltage into an alternate-current voltage with an arbitrary frequency and a first controller that controls the power converter, operation states of the motor and the rotary breaker, and an operation state of the second controller itself.

8 Claims, 5 Drawing Sheets

(56) References Cited

U.S. PATENT DOCUMENTS

| | | | |
|---|---|---|---|
| 2007/0086226 A1* | 4/2007 | Mavier et al. | 363/132 |
| 2009/0251831 A1 | 10/2009 | Shiba et al. | |
| 2010/0036555 A1* | 2/2010 | Hosoda et al. | 701/22 |
| 2010/0079093 A1* | 4/2010 | Kitanaka | 318/400.3 |
| 2010/0125384 A1* | 5/2010 | Wyatt et al. | 701/22 |
| 2010/0253267 A1* | 10/2010 | Kitanaka | 318/400.26 |

FOREIGN PATENT DOCUMENTS

| | | | |
|---|---|---|---|
| JP | 11-220806 A | | 8/1999 |
| JP | 2001197607 A | * | 7/2001 |
| JP | 2003134601 A | | 5/2003 |
| JP | 2006-311692 A | | 11/2006 |
| JP | 2007-028852 A | | 2/2007 |
| JP | 2007-306642 A | | 11/2007 |
| JP | 2007-318969 A | | 12/2007 |
| KR | 10-2006-0034918 A | | 4/2006 |
| WO | 2008001949 A1 | | 1/2008 |

OTHER PUBLICATIONS

Written Opinion (PCT/ISA/237) issued on Jul. 14, 2009, by Japanese Patent Office as the International Searching Authority for International Application No. PCT/JP2009/001641.

Office Action dated Nov. 14, 2012, issued in corresponding Korean Patent Application No. 10-2011-7023652, and an English Translation thereof. (8 pages).

Office Action from Chinese Patent Office dated Jun. 26, 2013, Issued in corresponding Chinese Patent Application No. 200980158540X, with a partial English translation thereof. (6 pages).

Office Action from Australian Patent Office (IP Australia) dated Aug. 21, 2013, Issued in corresponding Australian Patent Application No. 2009343996. (3 pages).

Extended Search Report from European Patent Office dated May 2, 2013, issued in corresponding European Patent Application No. 09842929.3. (6 pages).

Office Action from Australian Patent Office (IP Australia) dated Mar. 28, 2013, issued in corresponding Australian Patent Application No. 2009343996.(4 pages).

* cited by examiner

FIG.3

| ABNORMALITY DETERMINATION ITEMS / DEFECT MODES | 1 | 2 | 3 | 4 | 5 | 6 | 7 |
|---|---|---|---|---|---|---|---|
| SECOND CONTROLLER | × | ○ | ○ | ○ | ○ | ○ | ○ |
| ROTARY BREAKER | ○ | × | ○ | ○ | ○ | ○ | ○ |
| MOTOR SHORT-CIRCUIT STATE | ○ | ○ | × | ○ | ○ | ○ | ○ |
| MOTOR TEMPERATURE | ○ | ○ | ○ | × | ○ | ○ | ○ |
| POWER CONVERTING UNIT | ○ | ○ | ○ | ○ | ○ | × | × |
| SWITCH | ○ | ○ | ○ | ○ | × | ○ | × |
| DETECTION CURRENT | ○ | ○ | ○ | ○ | AT LEAST ONE IS × | | ○ |
| DETECTION VOLTAGE | ○ | ○ | ○ | ○ | | | ○ |
| ROTARY BREAKER OPEN/CLOSE STATE | OPEN (FAIL-SAFE) | OPEN (FAIL-SAFE) | OPEN | OPEN | OPEN | OPEN | OPEN |

DEFECT MODES IN WHICH ROTARY BREAKER BECOMES "OPEN" WHEN AT LEAST ONE OF ABNORMALITY DETERMINATION ITEMS INDICATED BY HATCHING IS ×

DEFECT MODES DETERMINED BASED ON ITEM OTHER THAN ABNORMALITY DETERMINATION ITEMS INDICATED BY HATCHING

| WHEN NORMAL | ○ |
|---|---|
| ABNORMALITY OCCURRED | × |

FIG.5

| DETECTING TARGET / DISCONNECTION MODE | 1 | 2 | 3 | 4 |
|---|---|---|---|---|
| CURRENT DETECTOR | × | ○ | ○ | ○ |
| VOLTAGE DETECTOR | × | ○ | ○ | ○ |
| TEMPERATURE DETECTOR | ○ | ○ | × | ○ |
| ROTARY BREAKER | ○ | ○ | ○ | × |
| SHORT-CIRCUIT DETECTOR | ○ | ○ | × | ○ |
| SWITCH | ○ | × | ○ | × |
| POWER CONVERTING UNIT | ○ | × | ○ | ○ |
| ROTARY BREAKER OPEN/CLOSE STATE<br>WHEN "×" IS AT ONE POSITION:<br>NO OPENING OPERATION<br>WHEN "×" IS AT TWO POSITIONS:<br>OPEN ONLY IN DISCONNECTION MODES 1 TO 3<br>WHEN "×" IS AT THREE OR MORE POSITIONS:<br>OPEN REGARDLESS OF MODE | OPEN | OPEN | OPEN | OPEN |

| | |
|---|---|
| NOT OCCURRED | ○ |
| OCCURRED | × |

DRIVE CONTROL SYSTEM

FIELD

The present invention relates to a drive control system including a motor (a permanent magnet motor) that has a permanent magnet incorporated therein and a drive control device that is driven by the permanent magnet motor.

BACKGROUND

A permanent magnet motor (hereinafter, simply "motor" unless otherwise particularly specified) has been known as a high-efficiency motor for the following reasons. As compared with an induction motor conventionally widely used in various fields, the permanent magnet motor does not require an excitation current because a magnetic flux by a permanent magnet incorporated in a rotor is established, and the permanent magnet motor does not generate a secondary copper loss because a current does not flow to a rotor conductor unlike in the induction motor. Although induction motors have been conventionally used for electric vehicles, in recent years, application of a permanent-magnet synchronous motor to electric vehicles has been examined so as to improve efficiency, to generate a large output in a reduced size, and to simplify cooling structures.

Generally, in an electric vehicle that runs while having a formation that has a combination of a plurality of vehicles, which have motors and drive control devices incorporated thereon, even when a motor connected to a drive control device in a part of the vehicles becomes inoperative because the drive control device stops functioning by generating a short-circuit defect during a running of the electric vehicle, for example, the electric vehicle can still continue running by other sound drive control devices and other sound motors. As a result, because the motor connected to the defective drive control device is kept being driven from a wheel side, a short-circuit current by an induced voltage of the motor continues to flow to a defective portion (a short-circuited position) of the drive control device having the short-circuit defect.

Therefore, when this state is left as it is, there is a risk of further worsening the damage of the defective portion of the drive control device by a short-circuit current, heat generated by the short-circuit current and the like, and causing heat generation and burning loss of the defective portion or the motor, and this is undesirable.

To deal with such cases, there is disclosed a method in which a motor open contactor as a motor-side switch unit that electrically separates a connection between an inverter and a motor is provided, so as to prevent worsening of the damage of an inverter by an induced voltage of a motor when a defect occurs in the inverter within a drive control device that drive-controls the motor when an electric vehicle is running. In this method, when a controller detects a defect of the inverter, the controller turns off the contactor and separates the inverter from the motor (for example, Patent Literature 1).
Patent Literature 1: Japanese Patent Application Laid-open No. H8-182105

SUMMARY

Technical Problem

However, even when the controller turns off the contactor when the inverter is defective, a contact incorporated in the contactor cannot be turned off due to a defect of the contactor, and even when the contactor is turned off when the magnitude of a short-circuit current exceeds the interruption capacity of the contactor, interruption of a short-circuit current becomes impossible due to continuation of an arc current and the like.

Further, when an earth fault is generated between the contactor and the motor or when a short circuit (an interlayer short circuit) or an earth fault is generated between coil windings within the motor, the short circuit cannot be solved even when the contactor positioned between the inverter and the motor is turned off. Consequently, it is impossible to interrupt a short-circuit current caused by the induced voltage within the motor.

In addition, there are also risks that the controller itself becomes defective, that a sensor fitted in the inverter becomes defective, and that a plurality of defects occur in a multiple manner at the same time. These problematic situations cannot be handled by the method disclosed in Patent Literature 1 mentioned above.

Further, because a permanent magnet motor has characteristics that the conventional motor described above does not have, when there is a trouble, there is a risk of occurrence of damage that is unpredictable in conventional motors. Therefore, there has been demanded that a drive control system having a permanent magnet motor is configured to include a function that can handle various conceivable problematic situations.

The present invention has been achieved in view of the above circumstances, and an object of the present invention is to provide a drive control system that can comprehensively handle various conceivable problematic situations in a drive control device and a motor, in the drive control system having a permanent magnet motor.

Solution to Problem

In order to solve above-mentioned problems and to achieve the object, a drive control system according to the present invention including a motor that incorporates therein a permanent magnet and a drive control device that controls the motor, the drive control system being applied to an electric vehicle having the drive control device and the motor incorporated thereon, wherein a rotary breaker that interrupts a transmission of a driving force from the motor to a drive mechanism unit is provided between the motor and the drive mechanism unit of the electric vehicle, and the drive control device includes, a power converting unit that has a power converter that drives the motor by converting a direct-current voltage or an alternate-current voltage into an alternate-current voltage with an arbitrary frequency, and a first controller that controls the power converter, and a second controller that controls the rotary breaker based on operation states of the power converting unit, the motor, and the rotary breaker, and an operation state of the second controller itself.

Advantageous Effects of Invention

According to the drive control system of the present invention, a drive control device that controls a permanent magnet motor (a motor) controls a rotary breaker based on operation states of the motor and a power converting unit that drives the motor, an operation state of the rotary breaker, and an operation state of a second controller itself that controls the rotary breaker, when controlling the rotary breaker that interrupts a transmission of a driving force from the motor, and therefore it is possible to provide a drive control system that can comprehensively handle various conceivable problematic situations in the drive control device and the motor.

BRIEF DESCRIPTION OF DRAWINGS

FIG. 3 is a table of defect modes in the first embodiment.

FIG. 5 is a table of disconnection modes in the second embodiment.

REFERENCE SIGNS LIST

3 WHEEL
10 POWER CONVERTING UNIT
11 CURRENT DETECTOR
12 SWITCH
14 VOLTAGE DETECTOR
15 MOTOR
16 SECOND CONTROLLER
18 DRIVE UNIT
21 POWER CONVERTER
22 FIRST CONTROLLER
26 FIRST SENSOR
27 SECOND SENSOR
28 ROTARY BREAKER
29 DRIVE MECHANISM UNIT
30 DRIVE AXIS
35 STATE DETERMINING UNIT
38 DISCONNECTION DETECTING UNIT
40 CURRENT DETECTING UNIT
42 VOLTAGE DETECTING UNIT
43 TEMPERATURE DETECTING UNIT
44 ROTARY-BREAKER-STATE DETECTING UNIT
45 SHORT-CIRCUIT DETECTING UNIT
46 SWITCH-STATE DETECTING UNIT
47, 48 CONTROLLER-STATE DETECTING UNIT
50 CURRENT DETERMINING UNIT
51 VOLTAGE DETERMINING UNIT
52 TEMPERATURE DETERMINING UNIT
60 ABNORMALITY DETERMINING UNIT
70 BREAKER CONTROLLER
100 DRIVE CONTROL SYSTEM

DESCRIPTION OF EMBODIMENTS

Exemplary embodiments of a drive control system according to the present invention will be explained below in detail with reference to the accompanying drawings. The present invention is not limited to the embodiments.

First Embodiment (Configuration of Drive Control System)

Figure 1:
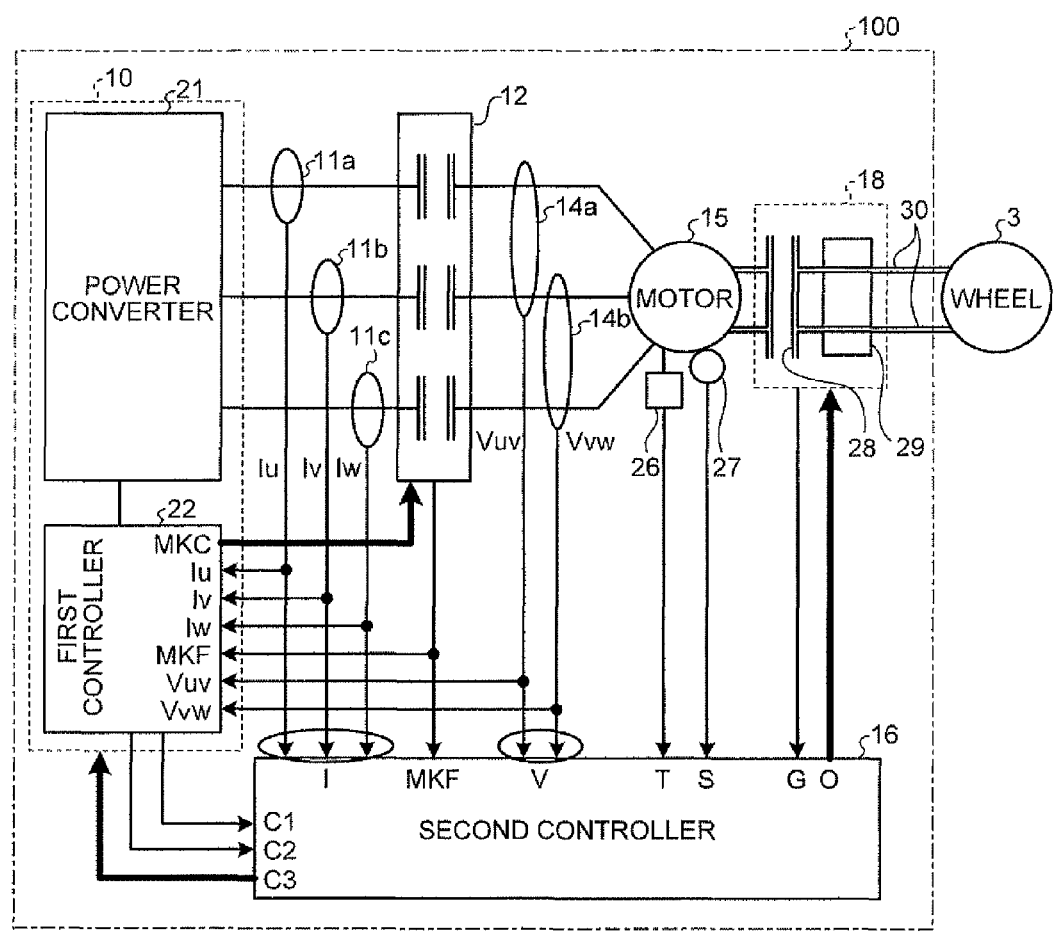
FIG. 1 is a configuration example of a drive control system according to a first embodiment of the present invention.

FIG. 1 is a configuration example of a drive control system according to a first embodiment of the present invention. In FIG. 1, a drive control system 100 according to the first embodiment is configured to include: a power converting unit 10 that includes a power converter 21 and a first controller 22 as principal constituent elements; a current detector 11 (11a, 11b, and 11c); a switch 12; a voltage detector 14 (14a and 14b); a motor 15; a second controller 16; and a drive unit 18 that includes a rotary breaker 28 and a drive mechanism unit 29. In the drive control system 100, other constituent elements excluding the motor 15 and the drive unit 18 are collectively referred to as "drive control device".

The power converter 21 is supplied with electric power from an overhead wire (not shown). The power converter 21 is configured to drive the motor 15 by converting an input direct-current voltage or an input alternate-current voltage into an alternate-current voltage with an arbitrary frequency. As a voltage to be input to the power converter 21, a direct-current voltage is input when a feeder facility feeds a direct current, and an alternate-current voltage is input when a feeder facility feeds an alternate current. Because a configuration of the power converter 21 is known for both cases of direct-current feeding and alternate-current feeding, detailed explanations thereof will be omitted.

At an output end side of the power converter 21, the current detector 11 (11a, 11b, and 11c) is provided for each phase. Detected currents Iu, Iv, and Iw are input to the first controller 22 and the second controller 16. Although the current detector 11 is provided for each phase in a configuration in FIG. 1, the current detector 11 can be also provided for arbitrary two phases. When the current detector 11 is provided for arbitrary two phases, a current in a phase for which the current detector is not provided can be calculated from currents in other two phases for which the current detector is provided.

At a latter stage of the current detector 11, the switch 12 that opens and closes a power supply to the motor 15 is provided. The switch 12 is configured such that an input coil is excited and a main contact provided in three phases is turned on, when an input signal MKC from the first controller 22 becomes on, and that the input coil is not excited and the main contact is opened, when the input signal MKC becomes off. A state of the main contact of the switch 12 is input to the first controller 22 and the second controller 16 as a contact state signal MKF. The contact state signal MKF can be also obtained by a signal from an auxiliary contact mechanically coupled to the main contact, for example. In FIG. 1, although the input signal MKC controlled by the switch 12 is configured to be output from the first controller 22, the input signal MKC can be also configured to be output from the second controller 16.

At a latter stage of the switch 12, the voltage detector 14 (14a and 14b) that detects an induced voltage of the motor 15 is provided, and detected line voltages Vuv and Vvw are input to the first controller 22 and the second controller 16. The motor 15 as a permanent magnet motor is connected to an output end of the switch 12. The motor 15 is provided with a first sensor 26 that detects a temperature (a coil temperature) of the motor 15, and a second sensor 27 that detects an interlayer short circuit and an earth fault (hereinafter, simply "short circuit") of the motor 15. A signal (a temperature detection signal T) detected by the first sensor 26 and a signal (a short circuit signal S) detected by the second sensor 27 are input to the second controller 16. A general temperature sensor such as a thermocouple, a thermistor, and a temperature IC can be used for the first sensor 26. A sensor (a short-circuit detection coil provided at a peripheral portion of a stator coil) as disclosed in Japanese Patent Application Laid-open No. 2000-287411 or the like can be used for the second sensor 27.

The drive unit 18 is provided between the motor 15 and a wheel 3 of an electric vehicle. In explaining more specifically, the drive mechanism unit 29 that constitutes the drive unit 18 is connected to a drive axis 30 that is connected to the wheel 3. The rotary breaker 28 that interrupts a transmission of a driving force from the motor 15 to the drive mechanism unit 29 is provided between the motor 15 and the drive mechanism unit 29. A signal (a rotary-breaker state signal G) that indicates whether the rotary breaker 28 is in an interruption state is input to the second controller 16. Meanwhile, the second controller 16 outputs a signal (a rotary-breaker control signal O) to turn off (an interruption state) the rotary breaker 28 to the rotary breaker 28. The second controller 16 also outputs a control signal (a power-converter stop signal C3) to stop an operation of the power converter 21 along with a control to turn off the rotary breaker 28 according to need.

Although a permanent magnet motor as described above is assumed for the motor 15 in FIG. 1, other motor than a synchronous motor can be also used when the motor incorporates a permanent magnet in a rotor. For example, a motor in a state that a permanent magnet is embedded into a rotor of an induction motor is present. A configuration and a control method based on the technical concept of the present invention can be applied to a motor of this kind.

Abnormalities (an interlayer short circuit and an earth fault) of a permanent magnet motor and abnormalities of a power converter are supplemented. For example, abnormalities of a permanent magnet motor and abnormalities of a power converter are as follows.

(1) Abnormalities of Motor (A) Short circuit: a state that wire insulation breakdown occurs between turns of a coil winding that is wound around an iron core of a motor, and a short circuit is formed within the coil winding.

(B) Earth fault: a state that insulation breakdown occurs between a coil winding that is wound around an iron core of a motor and the iron core, and the coil winding is conducted to the iron core.

(2) Abnormalities of Power Converter (A) Operation fault: a state that at least one of a plurality of switching elements incorporated in a power converter is inoperative.

(B) Element short circuit: a state that at least one of a plurality of switching elements incorporated in a power converter is short-circuited.

The second controller to be described below in detail is configured to be able to effectively handle these abnormalities of the motor and the power converter.

(Configuration of Second Controller)

Figure 2:
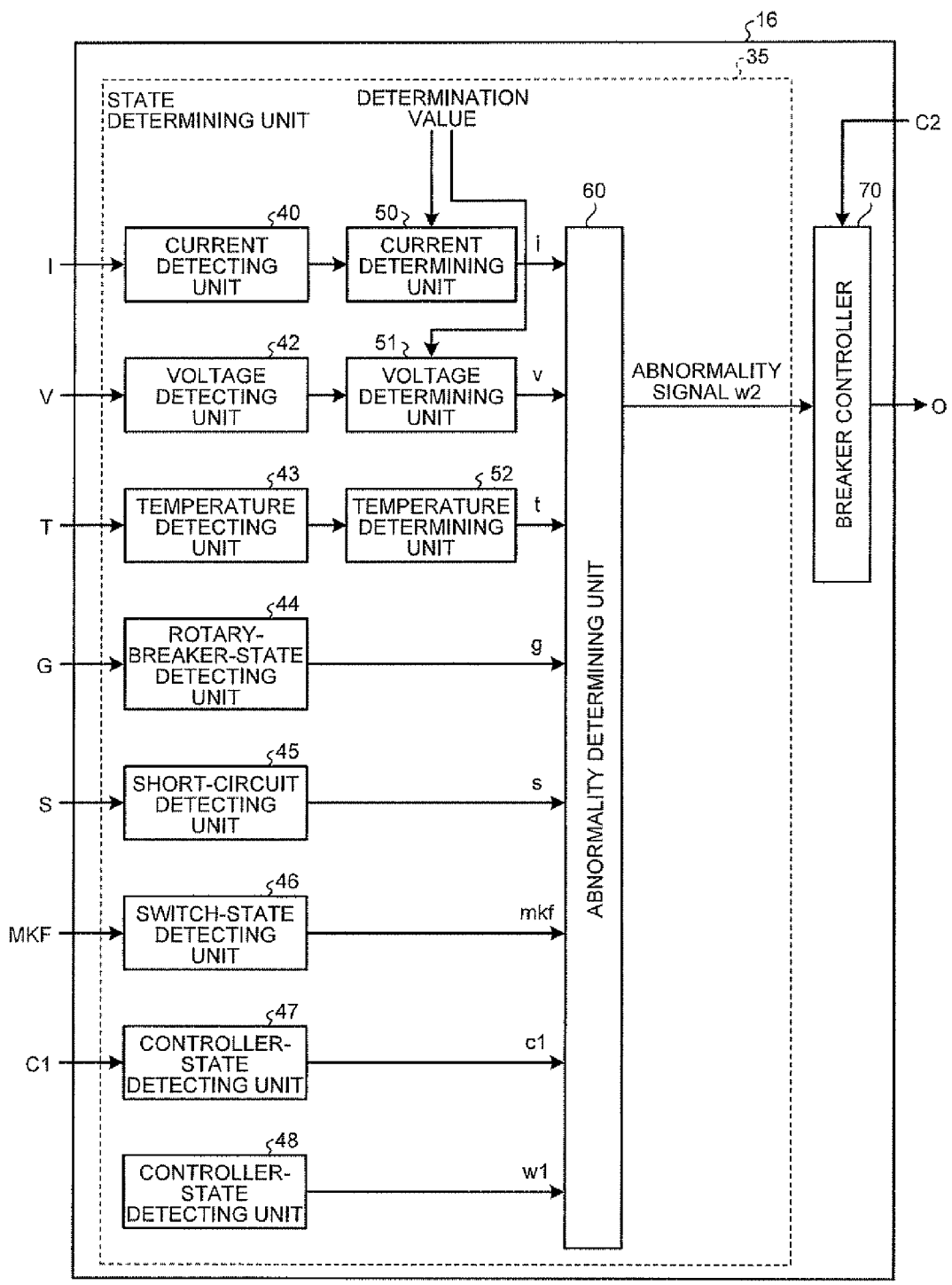
FIG. 2 is a configuration example of a second controller according to the first embodiment.

FIG. 2 is a configuration example of the second controller 16 according to the first embodiment of the present invention. In FIG. 2, the second controller 16 includes a state determining unit 35 and a breaker controller 70. The state determining unit 35 includes: a current detecting unit 40; a voltage detecting unit 42; a temperature detecting unit 43; a rotary-breaker-state detecting unit 44; a short-circuit detecting unit 45; a switch-state detecting unit 46; controller-state detecting units 47 and 48; a current determining unit 50 that is arranged at a latter stage of the current detecting unit 40; a voltage determining unit 51 that is arranged at a latter stage of the voltage detecting unit 42; a temperature determining unit 52 that is arranged at a latter stage of the temperature detecting unit 43; and an abnormality determining unit 60 that operates based on signals from the current determining unit 50, the voltage determining unit 51, the temperature determining unit 52, the rotary-breaker-state detecting unit 44, the short-circuit detecting unit 45, the switch-state detecting unit 46, and the controller-state detecting units 47 and 48.

The current detecting unit 40 detects presence or absence of a current from an input of a detection current I (Iu, Iv, and Iw), and outputs information of a detected current value to the current determining unit 50. The voltage detecting unit 42 detects presence or absence of a voltage from an input of a detection voltage V (Vuv and Vvw), and outputs information of a detected voltage value to the voltage determining unit 51.

The temperature detecting unit 43 receives the temperature detection signal T detected by the first sensor 26, and outputs temperature information that is generated based on the temperature detection signal T to the temperature determining unit 52. The rotary-breaker-state detecting unit 44 receives an input of the rotary-breaker state signal G that represents whether the rotary breaker 28 is in an interruption state, generates a determination signal g as a result of determining whether the rotary breaker 28 is operating and whether the rotary breaker 28 is normal, and outputs the determination signal g to the abnormality determining unit 60. The short-circuit detecting unit 45 generates a short circuit signal s that is converted into a signal format that is similar to that of other determination signal, based on the short circuit signal S detected by the second sensor 27, and outputs the short circuit signal s to the abnormality determining unit 60.

The switch-state detecting unit 46 receives an input of the contact state signal MKF from the switch 12, generates a determination signal mkf as a result of determining whether the switch 12 is normal, and outputs the determination signal mkf to the abnormality determining unit 60. The controller-state detecting unit 47 is a state detecting unit that is provided for the first controller 22. The controller-state detecting unit 47 receives a state signal C1 that is output when the first controller 22 is normal, generates a state signal c1 that indicates whether the first controller 22 is normal, and outputs the state signal c1 to the abnormality determining unit 60. The controller-state detecting unit 48 is a state detecting unit that detects an operation state of the second controller 16, that is, an operation state of the second controller itself, and outputs a state signal w1 that indicates whether the operation state of the second controller itself is abnormal, to the abnormality determining unit 60. A function of diagnosing whether the operation state of the second controller itself is abnormal can be achieved by using a known technique (a watchdog circuit, for example).

The current determining unit 50 generates a determination signal i as a result of comparing an output of the current detecting unit 40 with a predetermined determination value, and outputs the determination signal i to the abnormality determining unit 60. For example, when at least one of currents that flow in each phase is equal to or larger than a determination value, the current determining unit 50 generates and outputs the determination signal i that indicates an abnormality of a detection current. For the abnormality of a detection current, a state that a current continues to flow although the switch 12 is turned off is assumed. For example, this is a state that an abnormality occurs in the switch 12 or a state that the switch 12 cannot interrupt a current because the current is too large. In the present embodiment, the state including the latter case is considered as the abnormality of the switch 12.

The voltage determining unit 51 generates a determination value v as a result of comparing an output of the voltage detecting unit 42 with a predetermined determination value, and outputs the determination signal v to the abnormality determining unit 60. For example, when at least one of the line voltages is equal to or larger than a determination value, the voltage determining unit 51 generates and outputs the determination signal v that indicates an abnormality of a detection voltage. When the determination value is set as an allowable input voltage to the power converter 21, the damage of the power converter 21 due to an induced voltage of the motor 15 can be suppressed.

A case of determining a detection voltage as abnormal is explained by taking an example that an electric vehicle is coasting at a certain speed. In a state that the power converting unit 10 is controlled to off, the motor 15 is in a state of being rotated by the wheel 3 and a rotor of the motor 15 is rotating. Therefore, an induced voltage by the motor 15 appears in an input side terminal of the motor 15. A configuration of a stator coil of the motor 15 is such that phase coils of equal winding numbers are uniformly accommodated in a slot within a stator iron core as is well known. Therefore, line voltages by an induced voltage of the motor 15 become symmetrical alternate voltages during a normal time.

However, when an interlayer short circuit or an earth fault occurs in a part of stator coils within the motor 15, winding numbers of the phase coils become equivalently different, and the induced voltage does not become a symmetrical alternate voltage but becomes an unbalanced alternate current voltage. That is, by observing an induced voltage in a state that the power converting unit 10 is controlled to off and by comparing this induced voltage with an induced voltage that has a possibility of occurring during a normal time, an abnormality of the motor 15 can be detected.

Referring back to FIG. 2, the temperature determining unit 52 continuously monitors temperature information from the temperature detecting unit 43, and when an increase rate of a temperature exceeds a certain determination value, for example, the temperature determining unit 52 generates a determination signal t that indicates a temperature abnormality and outputs this signal to the abnormality determining unit 60.

The abnormality determining unit 60 receives inputs of the determination signal i from the current determining unit 50, the determination signal v from the voltage determining unit 51, the determination signal t from the temperature determining unit 52, the determination signal g from the rotary-breaker-state detecting unit 44, the short circuit signal s from the short-circuit detecting unit 45, the determination signal mkf from the switch-state detecting unit 46, the state signal c1 from the controller-state detecting unit 47, and the state signal w1 from the controller-state detecting unit 48, and determines an abnormality of the drive control system 100 according to a defect mode described later. The abnormality determining unit 60 generates an abnormality signal w2 when the abnormality determining unit 60 determines that the drive control system 100 is abnormal, and outputs the abnormality signal w2 to the breaker controller 70.

When the breaker controller 70 receives the abnormality signal w2 from the state determining unit 35, the breaker controller 70 controls the rotary breaker 28 to off based on the rotary-breaker control signal O, and controls the wheel 3 and the motor 15 in an interruption state. A control signal C2 that is input to the breaker controller 70 is based on a control command from an external device (for example, a control platform). In the present embodiment, the control signal C2 is configured to be input via the first controller 22.

FIG. 3 is a table of defect modes in the first embodiment. In the table shown in FIG. 3, abnormality determination items are shown at a side of the table, and defect modes are shown at the top of the table. The mark "○" in the table indicates that an abnormality determination item is normal, and the mark "x" in the table indicates that an abnormality occurs in an abnormality determination item. At the lowest row, it is indicated that the rotary breaker is opened as a switch state of the rotary breaker. That is, the table shown in FIG. 3 represents conditions to control the rotary breaker to "open".

Defect modes 1 to 4 are modes that the rotary breaker is controlled to "open" when at least one of abnormality determination items indicated by hatching becomes "x". That is, in these defect modes, the rotary breaker is controlled to "open" when an abnormality is present in either the second controller or the rotary breaker even when no abnormality is present in any of the power converting unit and the switch and also even when no abnormality is present in any of a detection current and a detection voltage, and when an abnormality is present in a motor temperature (a coil temperature) or when the motor is in a short-circuit state even when no abnormality is present in any of the second controller and the rotary breaker. A function of controlling the rotary breaker to "open" when an abnormality is present in any of the second controller and the rotary breaker is provided as a fail-safe function. As an example of a detailed achieving method of this fail-safe function, it can be configured such that when the second controller itself is normal, the rotary-breaker control signal O to control the rotary breaker to "close" is kept output, and that when an abnormality occurs in the second controller, an output of the rotary-breaker control signal O to the rotary breaker stops and the rotary breaker is controlled to "open". Further, it can be configured such that when the rotary breaker is normal, the rotary-breaker state signal G is kept output, and that when an output of the rotary-breaker state signal G stops, an output of the rotary-breaker control signal O to the rotary breaker stops by assuming that an abnormality occurs in the rotary breaker.

On the other hand, defect modes 5 to 7 are determined based on other than the abnormality determination items indicated by hatching. That is, in these defect modes, the rotary breaker is controlled to "open" when an abnormality is present in two or more of the power converting unit, the switch, the detection current, and the detection voltage even when no abnormality is present in any of the second controller, the rotary breaker, and the motor temperature and also even when the motor is not in a short-circuit state. When three or more items are determined as abnormal out of eight abnormality determination items (the second controller, the rotary breaker, the motor temperature, the motor short-circuit state, the power converting unit, the switch, the detection current, and the detection voltage), a determining process of a defect mode can be skipped by controlling the rotary breaker to "open" without determining a defect mode. Therefore, an effect that a process of controlling the rotary breaker to "open" can be speeded up can be obtained.

Respective defect modes are explained next.

<Defect Modes 1 and 2>

These are modes in which the rotary breaker can be opened when the rotary breaker and the second controller as relevant parts of the control function according to the first embodiment become defective, based on the concept of fail-safe.

<Defect Mode 3>

When a short circuit occurs within a coil of the motor, a short-circuit current cannot be suppressed until the coil is fused by heat generated by the short-circuit current so long as the motor is rotating. Further, because a coil periphery has a risk of being burnt by a short-circuit current, rotation of the motor needs to be immediately stopped when a short circuit occurs. This mode is provided in view of the above points.

<Defect Mode 4>

When a temperature of the motor becomes higher than a set value, this has a risk of generating fire, and therefore, the rotary breaker needs to open to suppress load of the motor. This is because when a short circuit occurs within a motor coil and when a temperature increases due to a short-circuit current, the temperature increase cannot be prevented even when a power supply is stopped. This mode becomes a double protection when a short-circuit detection has been failed. From these viewpoints, when an abnormality occurs in a motor temperature, the rotary breaker is controlled to "open" by this abnormality only.

<Defect Mode 5>

Even when the switch is defective, nothing occurs at this moment when the power converting unit is normal. However, in the power converting unit or the motor, when an electrical abnormal state (a detection voltage is larger than a set value; a detection voltage waveform is deviated from a defined waveform; a detection current is larger than a set value) occurs, rotation of the motor needs to be stopped to prevent further damage of the power converting unit and the motor. Even when only one of the electrical abnormal state occurs, there is a possibility of damage on devices. Therefore, when the switch is defective, when an abnormality is detected in any one of the detection current and the detection voltage, the rotary breaker is controlled to "open".

<Defect Mode 6>

When an abnormality occurs in the power converting unit, the switch is normally controlled to "open". However, when the switch is "open" and also when an abnormality of the detection current or the detection voltage as described in the defect mode 5 mentioned above is present, there is a risk of a failure in an opening operation of the switch or a motor short circuit. Therefore, when an abnormality occurs in the power converting unit, the rotary breaker is controlled to "open" by any one of the detection current and the detection voltage in a similar manner to that in the defect mode 5. By also considering a case that the switch fails in the opening operation, as described above, it is configured such that an opening operation signal (the contact state signal MKF) from the switch is input to the second controller to make it possible to determine a state that an open state is not obtained although the switch must be opened by a command from the first controller or the second controller.

<Defect Mode 7>

When the power converting unit and the switch are defective, this becomes a state that the opening operation of the switch is failed as explained in the defect mode 6 mentioned above. Therefore, when the power converting unit and the switch are defective, the rotary breaker is controlled to "open".

The concept of the defect modes and the abnormality determination items shown in FIG. 3 are only examples, and they are not limited to these examples. For example, defects can be handled by only the defect modes 1 to 4 without defining the defect modes 5 to 7. In this case, in FIG. 1, the current detector 11 and the voltage detector 14 do not need to be provided, and, in FIG. 2, the voltage detecting unit 42, the voltage determining unit 51, the current detecting unit 40, the current determining unit 50, the switch-state detecting unit 46, and the controller-state detecting unit 47 can be omitted. Further, in FIG. 1, the switch 12 can be omitted (in this case, in FIG. 2, the switch-state detecting unit 46 can be omitted). Even when the switch 12 is not present, a connection between the motor 15 and the wheel 3 can be interrupted by the rotary breaker 28, and the motor 15 is not kept being driven from a wheel 3 side.

Defects can be handled by the defect modes 1 and 2, and 5 to 7 without defining the defect modes 3 and 4. In this case, in FIG. 1, the first sensor 26 and the second sensor 27 do not need to be provided, and in FIG. 2, the temperature detecting unit 43, the temperature determining unit 52, and the short-circuit detecting unit 45 can be omitted. As described above, in a state when the power converter 21 is controlled to off, a voltage measured by the voltage detector 14 is an induced voltage generated by rotation of the motor 15. Therefore, an abnormality of the motor 15 can be detected by observing an unbalanced state of this induced voltage. That is, an abnormality of the motor 15 can be detected even when the first sensor 26, the second sensor 27, the temperature detecting unit 43, the temperature determining unit 52, and the short-circuit detecting unit 45 are not provided.

Further, in FIG. 3, one of the defect mode 3 and the defect mode 4 can be omitted. For example, when the defect mode 4 is omitted, in FIG. 1, the first sensor 26 does not need to be provided, and in FIG. 2, the temperature detecting unit 43 and the temperature determining unit 52 can be omitted. When the defect mode 3 is omitted, in FIG. 1, the second sensor 27 does not need to be provided, and in FIG. 2, the short-circuit detecting unit 45 can be omitted.

As explained above, according to the drive control system of the first embodiment, in controlling the rotary breaker that interrupts a transmission of a driving force from the motor, the system controls the rotary breaker based on operation states of the motor and the power converting unit that drives the motor, an operation state of the rotary breaker, and an operation state of the second controller itself that controls the rotary breaker. Therefore, the drive control system can comprehensively handle various conceivable problematic situations in the drive control device that controls the motor and in the motor.

Second Embodiment

Figure 4:
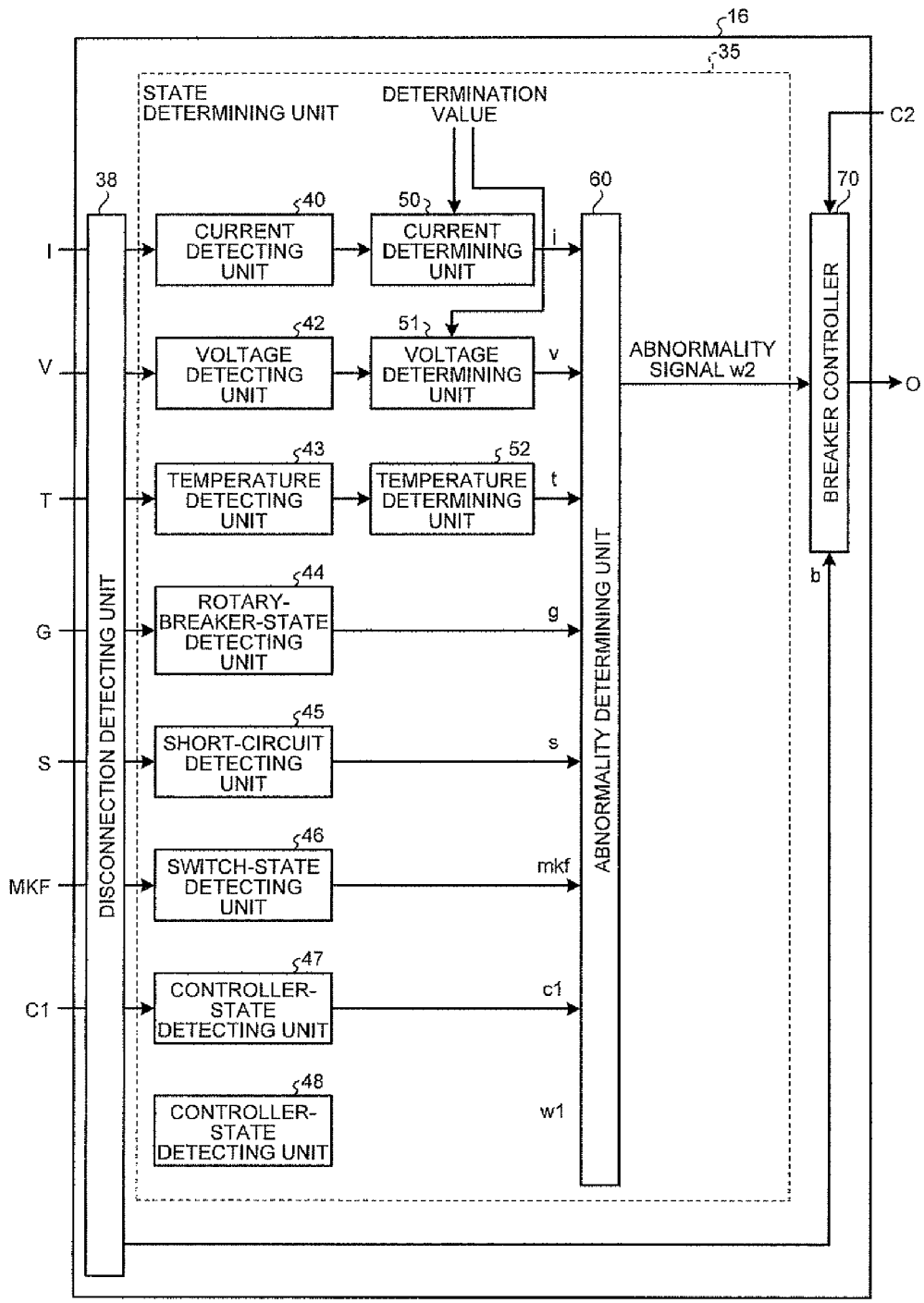
FIG. 4 is a configuration example of a second controller according to a second embodiment of the present invention.

FIG. 4 is a configuration example of a second controller according to a second embodiment of the present invention. In FIG. 4, the second controller 16 according to the second embodiment includes a disconnection detecting unit 38 at an input stage of the state determining unit 35, and a disconnection signal b that is detected by the disconnection detecting unit 38 is input to the breaker controller 70. Other constituent elements of the second controller 16 according to the second embodiment are identical or equivalent to those of the second controller 16 according to the first embodiment shown in FIG. 2, and thus these are denoted by like reference signs and explanations thereof will be omitted.

The disconnection detecting unit 38 always or periodically monitors the detection current I, the detection voltage V, the temperature detection signal T, the rotary-breaker state signal G, the short circuit signal S, the contact state signal MKF, and the state signal C1. When these signals stop, the disconnection detecting unit 38 determines that corresponding signal lines are disconnected, generates the disconnection signal b, and outputs this signal to the breaker controller 70, according to a disconnection mode described later. Stops of signals are also considered due to defects of devices other than disconnections, and it is assumed that, in a process of the disconnection detecting unit 38, defects of devices and the like are also handled as disconnections.

FIG. 5 is a table of disconnection modes in the second embodiment. In the table shown in FIG. 5, detecting targets are shown at a side of the table, and disconnection modes are shown at the top of the table. The mark "○" in the table indicates that the detecting target is normal, and the mark "x" in the table indicates that a disconnection occurs in the detecting target. At the lowest row, it is indicated that the rotary breaker is opened as open/close states of the rotary breaker. That is, the table shown in FIG. 5 represents conditions to control the rotary breaker to "open".

As shown in FIG. 5, as disconnection modes in the second embodiment, disconnection modes 1 to 4 are defined. The disconnection mode 1 is a mode in which a disconnection occurs in signal lines from the current detector and the voltage detector. Thereafter, similarly, the disconnection mode 2 is a mode in which a disconnection occurs in signal lines from the switch and the power converting units. The disconnection mode 3 is a mode in which a disconnection occurs in signal lines from a temperature detector and a short-circuit detector, and the disconnection mode 4 is a mode in which a disconnection occurs in signal lines from the rotary breaker and the switch.

In each of the detecting items, when a disconnection occurs at two positions, the second controller controls the rotary breaker to "open" in only the disconnection modes 1 to 4. When a disconnection occurs at only one position, the second controller does not control the rotary breaker to "open". On the other hand, when a disconnection occurs at three or more positions, the second controller controls the rotary breaker to "open" without determining the disconnection mode. In this case, because a determination process of determining whether the mode is a disconnection mode can be skipped, an effect that a process of controlling the rotary breaker to "open" can be speeded up can be obtained.

Respective disconnection modes are explained next.

<Disconnection Mode 1>

As explained in the section of the defect mode 5, when an electrical abnormal state occurs in the power converting unit or the motor, rotation of the motor needs to be stopped to prevent the damage of the power converting unit and the motor. Therefore, when a disconnection occurs in signal lines from the power converting unit and the motor, the second controller controls the rotary breaker to "open" because a function of detecting the electrical abnormal state is lost.

<Disconnection Mode 2>

As explained in the section of the defect mode 6, when an abnormality occurs in the power converting unit, the switch is controlled to "open". However, when an abnormality is present in the switch, there is a case that the switch fails in an opening operation and the switch does not "open". In this case, an induced voltage by the motor that is driven by the wheel is applied to the power converting unit, and there is risk that the power converting unit is damaged. Therefore, when a disconnection occurs in the signal lines from the switch and the power converting unit, the second controller controls the rotary breaker to "open".

<Disconnection Mode 3>

As explained in the section of the defect mode 3, when a short circuit occurs within the coil of the motor, a short-circuit current cannot be suppressed until the coil is fused by heat generated by the short-circuit current so long as the motor is rotating. Meanwhile, a heat generation phenomenon of the motor can be detected or suppressed by one of functions of the temperature detector and the short-circuit detector. However, when both functions of the temperature detector and the short-circuit detector are lost, a heat generation phenomenon of the motor cannot be detected or suppressed. Therefore, when a disconnection occurs in signal lines from the temperature detector and the short-circuit detector, the second controller controls the rotary breaker to "open".

<Disconnection Mode 4>

As explained in the disconnection mode 3, when a short circuit occurs within the coil of the motor, a short-circuit current cannot be suppressed until the coil is fused by heat generated by the short-circuit current so long as the motor is rotating. Meanwhile, when functions of the rotary breaker and the switch are lost, there is no means for mechanically disconnecting a connection between the power converting unit and the wheel. Therefore, when a disconnection occurs in signal lines from the rotary breaker and the switch, the second controller controls the rotary breaker to "open".

The concept of the disconnection modes and the detecting targets shown in FIG. 5 are only examples, and they are not limited to these examples. For example, when the current detector, the voltage detector, the temperature detector, the short-circuit detector, or the switch are not provided, signal lines from these detectors and the switch do not need to be detecting targets.

As explained above, according to the drive control system of the second embodiment, the disconnection detecting unit provided in the state determining unit monitors signals detected from the temperature detector, the short-circuit detector, the current detector, and the voltage detector and signals that indicate operation states of the rotary breaker, the switch, and the power converting unit. When signal inputs from the current detector and the voltage detector stop, when signal inputs from the switch and the power converting unit stop, when signal inputs from the temperature detector and the short-circuit detector stop, or when signal inputs from the switch and the rotary breaker stop, the drive control system generates a disconnection signal that indicates an occurrence of a disconnection in a signal line for transmitting each of the signals, and outputs the disconnection signal to the breaker controller. The breaker controller generates a signal to interrupt the rotary breaker and outputs the signal to the rotary breaker based on a disconnection signal. Therefore, the second embodiment can contribute to improve the reliability of a drive control system that includes a permanent magnet motor.

INDUSTRIAL APPLICABILITY

As described above, the drive control system according to the present invention is useful as an invention that can comprehensively handle various conceivable problematic situations in a drive control device and a motor.

The invention claimed is:

1. A drive control system comprising a motor that incorporates therein a permanent magnet and a drive control device that controls the motor, the drive control system being applied to an electric vehicle having the drive control device and the motor incorporated thereon, wherein
a rotary breaker that interrupts a transmission of a driving force from the motor to a drive mechanism unit is provided between the motor and the drive mechanism unit of the electric vehicle, and
the drive control device includes:
a power converting unit that has a power converter that drives the motor by converting a direct-current voltage or an alternate-current voltage into an alternate-current voltage with an arbitrary frequency, and a first controller that controls the power converter; and
a second controller that controls the rotary breaker based on operation states of the power converting unit, the motor, and the rotary breaker, and an operation state regarding a fault of the second controller itself.

2. The drive control system according to claim 1, wherein the drive control device includes a temperature detector that detects a temperature of the motor and a short-circuit detector that detects a short-circuit state or an earth fault state of a coil winding of the motor, and
the second controller includes:
a state determining unit that monitors signals detected from the temperature detector and the short-circuit detector and signals that indicate operation states of the rotary breaker and the second controller itself, and that generates a determination signal that indicates an occurrence of an abnormality in the drive control device when at least one of the signals is determined as abnormal; and
a breaker controller that generates a signal to interrupt the rotary breaker and outputs the signal to the rotary breaker based on the determination signal.

3. The drive control system according to claim 1, wherein
the drive control device includes a current detector that detects a current that flows to the motor, a voltage detector that detects an induced voltage of the motor, and a switch that is connected between the motor and the power converting unit and opens and closes power to the motor, and
the second controller includes:
a state determining unit that monitors signals detected from the current detector and the voltage detector and signals that indicate operation states of the switch, the rotary breaker, the power converter, and the second controller itself, and that generates a determination signal that indicates an occurrence of an abnormality in the drive control device when operation states of the rotary breaker and the second controller itself are normal, when an operation state of one of the power converting unit and the switch is abnormal, and also when at least one of signals detected from the current detector and the voltage detector is abnormal; and
a breaker controller that generates a signal to interrupt the rotary breaker and outputs the signal to the rotary breaker based on the determination signal.

4. The drive control system according to claim 1, wherein
the drive control device includes a current detector that detects a current that flows to the motor, a voltage detector that detects an induced voltage of the motor, and a switch that is connected between the motor and the power converting unit and opens and closes power to the motor, and
the second controller includes:
a state determining unit that monitors signals detected from the current detector and the voltage detector and signals that indicate operation states of the switch, the rotary breaker, the power converter, and the second controller itself, and that generates a determination signal that indicates an occurrence of an abnormality in the drive control device when operation states of the rotary breaker and the second controller itself are normal, when signals detected from the current detector and the voltage detector are normal, and also when operation states of both the power converting unit and the switch are abnormal; and
a breaker controller that generates a signal to interrupt the rotary breaker and outputs the signal to the rotary breaker based on the determination signal.

5. The drive control system according to claim 1, wherein
the drive control device includes a temperature detector that detects a temperature of the motor, a short-circuit detector that detects an interlayer short circuit or an earth fault in a coil winding of the motor, a current detector that detects a current that flows to the motor, a voltage detector that detects an induced voltage of the motor, and a switch that is connected between the motor and the power converting unit and that opens and closes power to the motor, and
the second controller includes:
a state determining unit that monitors signals detected from the temperature detector and the short-circuit detector, signals that indicate operation states of the rotary breaker and the second controller itself, signals detected from the current detector and the voltage detector, and signals that indicate operation states of the switch and the power converting unit, and that generates a determination signal that indicates an occurrence of an abnormality in the drive control device even when there is no abnormality in signals detected from the power converting unit, the switch, the current detector, and the voltage detector when it is determined that there is an abnormality in at least one of signals detected from the temperature detector and the short-circuit detector and signals that indicate operation states of the rotary breaker and the second controller itself; and
a breaker controller that generates a signal to interrupt the rotary breaker and outputs the signal to the rotary breaker based on the determination signal.

6. The drive control system according to claim 1, wherein
the drive control device includes a temperature detector that detects a temperature of the motor, a short-circuit detector that detects an interlayer short circuit or an earth fault in a coil winding of the motor, a current detector that detects a current that flows to the motor, a voltage detector that detects an induced voltage of the motor, and a switch that is connected between the motor and the power converting unit and that opens and closes power to the motor, and
the second controller includes:
a state determining unit that monitors signals detected from the temperature detector and the short-circuit detector, signals that indicate operation states of the rotary breaker and the second controller itself, signals detected from the current detector and the voltage detector, and signals that indicate operation states of the switch and the power converting unit, and that generates a determination signal that indicates an occurrence of an abnormality in the drive control device when all of signals detected from the temperature detector and the short circuit detector and signals that indicate operation states of the rotary breaker and the second controller itself are normal, when an operation state of one of the power converting unit and the switch is abnormal, and also when at least one of signals detected from the current detector and the voltage detector is abnormal; and
a breaker controller that generates a signal to interrupt the rotary breaker and outputs the signal to the rotary breaker based on the determination signal.

7. The drive control system according to claim 1, wherein
the drive control device includes a temperature detector that detects a temperature of the motor, a short-circuit detector that detects an interlayer short circuit or an earth fault in a coil winding of the motor, a current detector that detects a current that flows to the motor, a voltage detector that detects an induced voltage of the motor, and a switch that is connected between the motor and the power converting unit and that opens and closes power to the motor, and
the second controller includes:
a state determining unit that monitors signals detected from the temperature detector and the short-circuit detector, signals that indicate operation states of the rotary breaker and the second controller itself, signals detected from the current detector and the voltage detector, and signals that indicate operation states of the switch and the power converting unit, and that generates a determination signal that indicates an occurrence of an abnormality in the drive control device when all of signals detected from the temperature detector and the short circuit detector, signals that indicate operation states of the rotary breaker and the second controller itself, and signals detected from the current detector and the voltage detector are normal, and also when operation states of the power converting unit and the switch are abnormal; and a breaker controller that generates a signal to interrupt the rotary breaker and outputs the signal to the rotary breaker based on the determination signal.

8. The drive control system according to claim 1, wherein the rotary breaker is configured such that, when a control signal from the second controller stops, a transmission of a driving force from the motor to the drive mechanism unit is interrupted.

* * * * *